(12) United States Patent
Diehl et al.

(10) Patent No.: US 8,416,496 B2
(45) Date of Patent: Apr. 9, 2013

(54) DEVICE FOR DIVIDING AN OPTICAL BEAM INTO FOUR BEAMS AND NON-CONTACT OPTICAL PROFILOMETER COMPRISING SAME

(75) Inventors: Damon W. Diehl, Rochester, NY (US); Christopher T. Cotton, Honeoye Falls, NY (US)

(73) Assignee: ASE Optics Inc., Rochester, NY (US)

( * ) Notice: Subject to any disclaimer, the term of this patent is extended or adjusted under 35 U.S.C. 154(b) by 590 days.

(21) Appl. No.: 12/728,199

(22) Filed: Mar. 20, 2010

(65) Prior Publication Data

US 2012/0044502 A1 Feb. 23, 2012

Related U.S. Application Data

(60) Provisional application No. 61/162,628, filed on Mar. 23, 2009.

(51) Int. Cl.
*G02B 5/30* (2006.01)
*G02B 27/28* (2006.01)
(52) U.S. Cl. .......... 359/489.15; 359/489.07; 359/489.08
(58) Field of Classification Search ............ 359/489.06, 359/489.07, 489.08, 489.15
See application file for complete search history.

(56) References Cited

U.S. PATENT DOCUMENTS 5,251,057 A 10/1993 Guerin et al.
7,046,370 B2 * 5/2006 Carlson .................. 356/493

OTHER PUBLICATIONS

Website documents from Michelson Diagnostics Ltd., available at http://www.md-ltd.co.uk. VivoSight OCT scanner product and press release announcing availability Jul. 8, 2009.
Website documents from Stil S.A., available at http://www.stilsa.com. MPLS Field Sensor web page and pdf catalog information. Earliest known availability approx. May 15, 2009.

* cited by examiner

*Primary Examiner* — William Choi
(74) *Attorney, Agent, or Firm* — John M Hammond; Patent Innovations LLC (57) ABSTRACT

An optical probe for splitting a beam of light into multiple beams. The optical probe may comprise a first polarizing beam splitter having a first polarization axis, a second polarizing beam splitter having a second polarization axis orthogonal to the first polarization axis, a first half wave plate and a second half wave plate, and optionally a first birefringent phase plate, and a second birefringent phase plate. The first half wave plate may be located before first polarizing beam splitter, and the second half wave plate may be located after the first polarizing beam splitter, relative to the propagation of the light beam. The optical probe may further include a lens for collimating the four light beams. A profilometer includes the optical probe for splitting a beam of light into four light beams, and a scanner for traversing the optical probe over a surface of an element to be measured.

16 Claims, 7 Drawing Sheets

DEVICE FOR DIVIDING AN OPTICAL BEAM INTO FOUR BEAMS AND NON-CONTACT OPTICAL PROFILOMETER COMPRISING SAME

CROSS-REFERENCE TO RELATED PATENT APPLICATION

This application claims priority from U.S. provisional patent application Ser. No. 61/162,628 filed Mar. 23, 2009, the disclosure of which is incorporated herein by reference.

STATEMENT REGARDING FEDERALLY SPONSORED RESEARCH OR DEVELOPMENT

This invention was made with U.S. Government support under Contract No. N68936-08-C-0030 awarded by the United States Navy as a Small Business Innovation Research Phase I Grant for SBIR Topic N081-029. The U.S. Government has a paid-up license in this invention and the right under limited circumstances to require the patent owner to license others on reasonable terms as provided for by the terms of the above contract.

BACKGROUND

1. Technical Field

Devices for splitting a beam of light into multiple beams, and apparatus for measuring and testing of objects by detecting interference between the respective multiple beams and beams reflected back from one or more surfaces of an object.

2. Description of Related Art

In recent years, advances in optical fabrication technology have occurred that have enabled the production of increasingly complex non-rotationally symmetric optical elements. For example, in Proc. SPIE Vol. 3779, p. 434-444, *Current Developments in Optical Design and Optical Engineering VIII*, Robert E. Fischer, Warren J. Smith, Eds., "Capabilities of an Arch Element for Correcting Conformal Optical Domes," Sparrold et al. disclose an arcuate-shaped non-rotationally symmetric optical element having a rotationally symmetric tip and a side characterized with astigmatic properties. In the related U.S. Pat. No. 6,310,730 of Knapp et al., the disclosure of which is incorporated herein by reference, there is disclosed an optical system including a curved window, an asymmetric, scoop-shaped optical corrector adjacent to a curved inner surface of the window, an optical train positioned such that the optical corrector lies between the curved window and the optical train, a movable optical train support upon which the optical train is mounted, and a sensor disposed to receive an optical ray passing sequentially through the window, the optical corrector, and the optical train. The optical corrector has an inner surface and an outer surface, at least one of which has a shape defined by an asymmetric polynomial.

As optical fabrication technology has improved, and the complexity of optical elements has increased, the need for improved metrology equipment to manufacture, measure, and inspect such elements has followed. For example, for the arch optic disclosed in the above reference of Sparrold et al., the two key metrology challenges are that the interior and exterior surfaces may not be spherical, and that the interior and exterior surfaces may not be parallel. There is a need to measure the location and orientation of surface regions on the optical element as well as the thickness of the optical element across a large range of points distributed over its working surface.

Interferometric methods for measuring the thickness and other physical or optical properties of an object are known. For example, U.S. Pat. No. 5,659,392 of Marcus et al., the disclosure of which is incorporated herein by reference, discloses an apparatus and method for measuring physical properties of an object, such as thickness, group index of refraction, and distance to a surface. The apparatus includes a low-coherence light interferometer and a coherent light interferometer in association so as to share a variable optical path delay element. Further disclosures of fiber optic interferometers and methods and apparatus using fiber optic interferometry are provided by Marcus et al. in U.S. Pat. Nos. 6,614,534, 6,038,027, 6,067,161, and 5,596,409, the disclosures of which are incorporated herein by reference. A metrology system that uses the principles disclosed in these patents is made and sold commercially as the OPTIGAUGE™ by Lumetrics, Inc. of West Henrietta, N.Y.

Although such apparatus and methods are effective for measurement of optical elements of certain shapes, they are not optimal for the measurement of complex non-rotationally symmetric optical elements.

What is needed is an optical profilometer that measures both the position and orientation of surface patches for general three-dimensional shapes. There is further needed an optical probe in such a profilometer that enables the measurement of the orientation of small regions on the surface of an optical element across an array of points distributed over the surface thereof, as well as the thickness of the optical element across the array of points on the surface thereof.

SUMMARY

The present disclosure meets this need by providing a profilometer apparatus for measuring the location and orientation of surface regions on a three-dimensional object. The apparatus projects a plurality of light beams that are used to measure the distance from a probe in the apparatus to the surface of the object under test. The apparatus may project at least three light beams onto the object. One optical probe of the apparatus splits a light beam into four light beams to be projected onto the object. The positions of the intersections of the beams with the object in three-dimensional space are calculated based on their distance from the probe.

Each measurement beam can be used to provide the determination of one point on the surface. By having a plurality of points, e.g., three points or four points, a "surface facet" may be fitted to the points. By calculating the best-fit surface for the measured intersection points, the orientation of the surface facet with respect to the probe can be calculated. By scanning either the probe or object with respect to one another, and measuring the position and location of the surface with respect to the probe, multiple surface facets can be defined, such that the shape of the entire three-dimensional surface is determined. The apparatus can thus provide a full three-dimensional model of the entire object. Overlapping neighboring measurements can increase the accuracy of the model, such that overlapping surface facets are defined. By requiring agreement in the overlapped regions, errors and inconsistencies in the measurements can identified and corrected.

More specifically, in accordance with the present disclosure, there is provided an optical probe for splitting a light beam into four light beams, the optical probe comprising a first polarizing beam splitter having a first polarization axis, a second polarizing beam splitter having a second polarization axis orthogonal to the first polarization axis, a first half wave plate and a second half wave plate. These optical components are configured such that an incoming light beam enters the first component, and as a result of the optical effects and arrangement of the respective components, four light beams exit the last component. The first half wave plate may be located before first polarizing beam splitter, and the second half wave plate may be located after the first polarizing beam splitter, relative to the propagation of the light beam. The optical probe may further include a first birefringent phase plate and a second birefringent phase plate.

The optical probe may further include a lens for collimating the four light beams. The optical probe may further include a window comprising a reference surface through which the four light beams pass. The first and second polarizing beam splitters may be comprised of Wollaston prisms. The beam splitters, half wave plates, and phase plates of the probe may be contained in a housing or fixture.

In accordance with the present disclosure, there is further provided a method of splitting an incoming light beam into four light beams. The method comprises aligning the polarization of the incoming light beam with respect to the polarization axis of a first polarizing beam splitter; splitting the incoming light beam into a first intermediate light beam of a first polarization, and a second intermediate light beam of a second polarization; delaying the first intermediate light beam relative to the second intermediate light beam; aligning the polarization of the first and second intermediate light beams with respect to the polarization axis of a second polarizing beam splitter; and further splitting the first and second intermediate light beams into a first light beam of a third polarization, a second light beam of a fourth polarization, a third light beam of a fifth polarization, and a fourth light beam of a sixth polarization. The method may further comprise delaying the first light beam relative to the second light beam and delaying the third light beam relative to the fourth light beam, and/or collimating the first, second, third, and fourth light beams. The steps of the method may be performed in orders other than described above, depending upon the arrangement of the optical components of an optical probe used in the method, as will be described subsequently herein.

In accordance with the present disclosure, there is further provided an optical profilometer comprising the above optical probe for splitting a beam of light into four light beams, and a scanner for traversing the optical probe over a surface of an element to be measured. The profilometer may further include an interferometer in communication with the optical probe.

BRIEF DESCRIPTION OF THE DRAWINGS

The inventions disclosed herein will be described by reference to the following drawings, in which like numerals refer to like elements, and in which.

The inventions disclosed herein will be described in connection with preferred embodiments; however, it will be understood that there is no intent to limit the inventions to the embodiments described. On the contrary, the intent is to cover all alternatives, modifications, and equivalents as may be included within the spirit and scope of the inventions as defined by the appended claims.

DESCRIPTION OF THE PREFERRED EMBODIMENTS

For a general understanding of the present disclosure, reference is made to the drawings. In the drawings, like reference numerals have been used throughout to designate identical elements. In the following disclosure, certain components may be described with the adjectives "top," "upper," "bottom," "lower," "horizontal," "vertical," "forward," "rearward," etc. These adjectives are provided only in the context of the profilometer and quad probe apparatus as shown in the drawings, and are not to be construed as limiting the apparatus to use in a particular spatial orientation. The apparatus may be used in orientations other than those shown and described herein.

Figure 1:
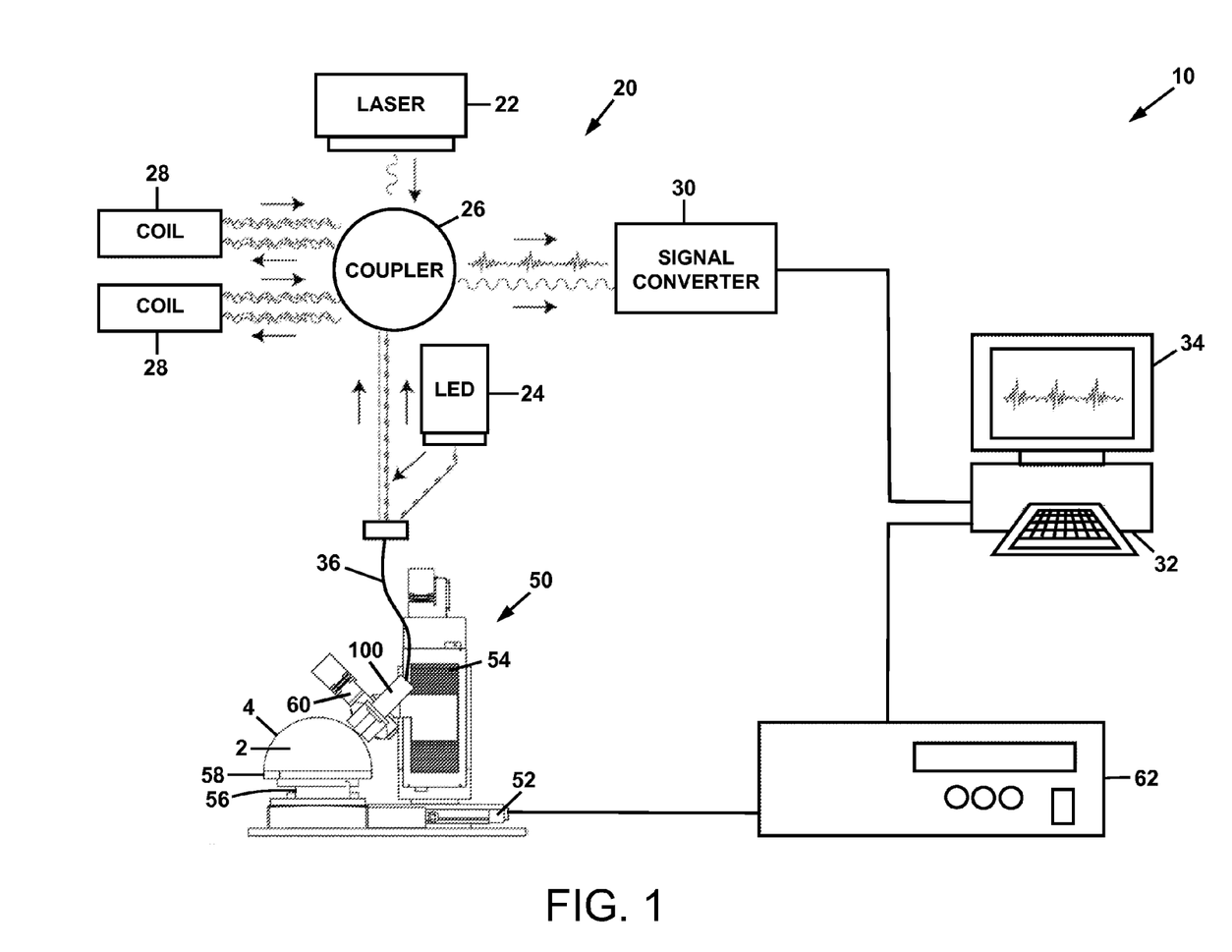
FIG. 1 is a schematic diagram of an optical profilometer system, including a scanner that articulates an optical "quad probe" that splits a light beam into four equal light beams in accordance with the present disclosure.

Referring first to FIG. 1, and in one embodiment, the applicants' profilometer system is comprised of an interferometer 20, and a scanner 50 for scanning the surface of optical element 2. The interferometer 20 may be a fiber optic low-coherence interferometer as disclosed in the aforementioned U.S. Patents of Marcus et al. The interferometer 20 may be an OPTIGAUGE™ system sold by Lumetrics Inc., or a system similar thereto and comprising a laser 22, a light emitting diode 24, a fiber optic coupler 26, a pair of fiber stretching coils 28, a light-to electrical signal converter 30, a process controller 32, and a display 34. In one embodiment, the LED 24 may provide broadband infrared radiation centered on a wavelength of 1.3 microns.

Figure 2:
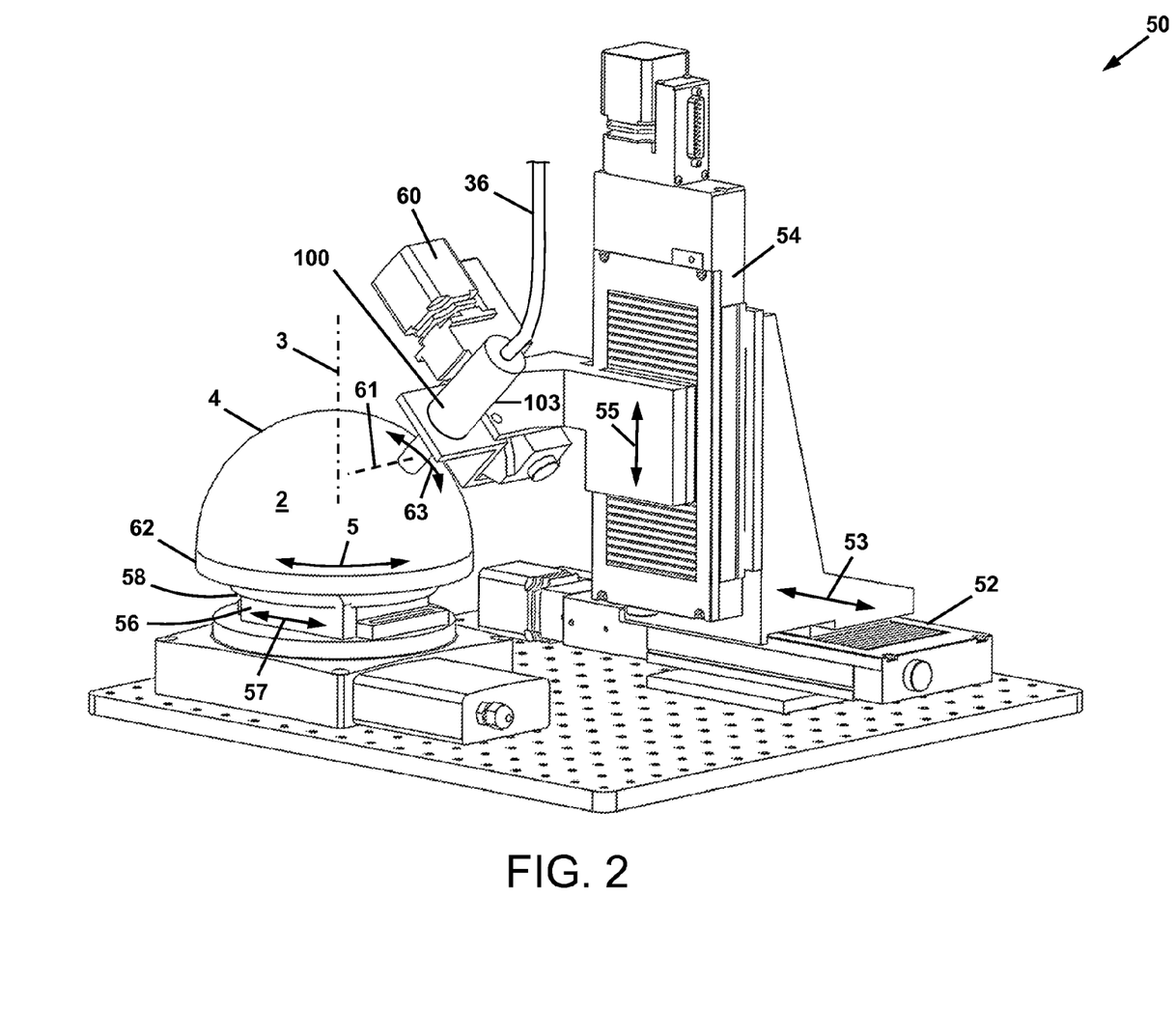
FIG. 2 is a perspective view of one embodiment of a scanner of the optical profilometer, including the quad probe.

Referring also to FIG. 2, the scanner 50 is comprised of linear actuators 52 54, and 56, and rotational actuators 58 and 60 for scanning a probe 100 relative to the surface 4 of an optical element 2. The scanner 50 further includes a mechanical controller 62 in communication with the linear and rotational actuators and with the process controller 32. The probe 100 is preferably a quad probe of the present invention, the details of which will be explained subsequently herein.

In the operation of the scanner 50, linear actuator 52 provides motion of probe 100 along a first horizontal axis 53, and linear actuator 54 provides motion of probe 100 along a first vertical axis 55. Linear actuator 56 provides motion of the optical element 2 along axis 57 relative to the optical probe 100. Rotational actuator 58 provides rotational motion of optical element 2 around its central axis of rotation 3, as indicated by bidirectional arcuate arrow 5. Rotational actuator 60 provides rotational motion of probe 100 around its axis of rotation 61, as indicated by bidirectional arcuate arrow 63. The optical element 2 is secured to a rotating base 62 by an adhesive pitch (not shown), by vacuum (not shown), or by other means known in the optical fabrication arts.

The combination of scanner motions along linear axes 53, 55, and 57, and around rotational axes 3 and 61 enable the probe 100 to be scanned over the entire outer surface 4 of the optical element 2. It will be apparent that many other arrangements of mechanical and rotational actuators may be use to achieve the same result, with the operative requirement being that the probe 100 is scannable over at least a portion of and preferably the entire outer surface 4. Additionally, although the optical element 2 is shown in FIGS. 1 and 2 as being substantially hemispherical in shape, it is to be understood that scanner 50 is capable of scanning probe 100 over non-rotationally symmetric optics having a variety of shapes, including the conformal dome element 6 of FIG. 5A.

In one embodiment, the interferometer 20 may be an OPTI-GAUGE™ fiber optic interferometer as described previously. In such an instance, the standard single beam optical probe of such interferometer is replaced by the probe 100 of scanner 50. The probe 100 is in communication with the interferometer 20 through cable 36, which contains at least one fiber optic.

The probe 100 may be an optical quad probe of the present disclosure, which splits a single beam of light into four "equal" light beams that are substantially of equal intensity, and that are separated in phase by uniform intervals. By providing the four light beams that are displaced from an optical axis by a short distance, it is possible to analyze the measurement data obtained from each beam, and to define a surface facet bounded by the four point measurements made from each beam. Subsequently, by scanning the quad probe over the entire surface of the optical element 2 (or element 6 of FIGS. 5A and 5B), and by overlapping the individual measurements such that overlapping facets are defined, it is further possible to average such redundantly measured facets to characterize the surface of the optical element as a substantially smooth surface in three dimensions. In the fabrication of the optical elements 2 or 6, the surface thusly characterized can be compared to the target (desired) shape of the surface, to determine if it meets specifications within acceptable tolerances. If the surface does not meet specifications, further removal of material from the surface may proceed by various known optical polishing methods, or other surface material removal methods, until the surface geometry meets the required specifications.

Figure 3:
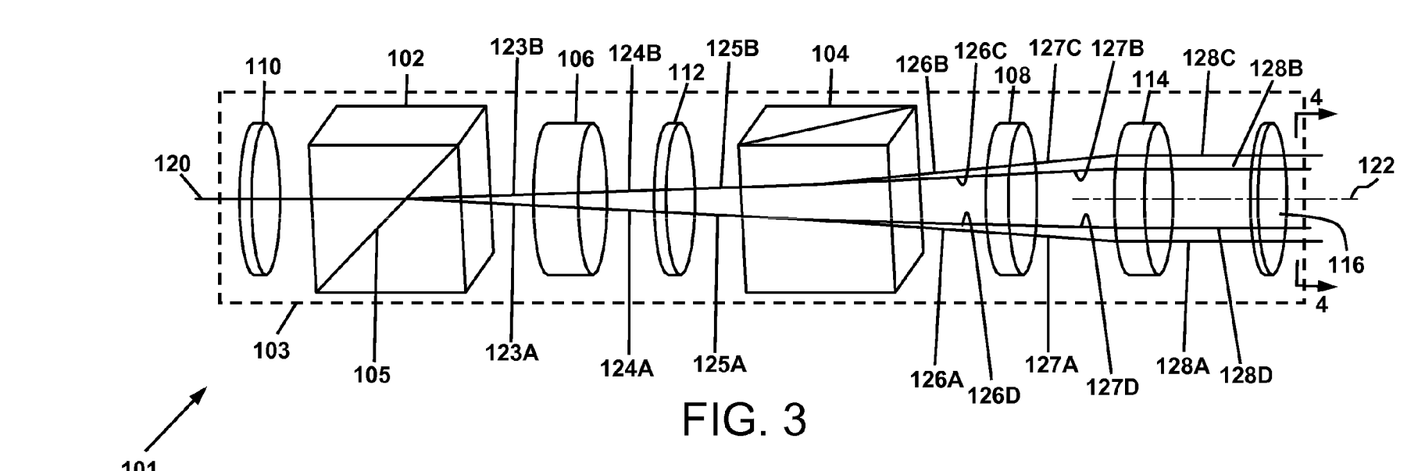
FIG. 3 is a perspective view of one embodiment of an optical quad probe for splitting a light beam into four equal light beams.

FIG. 3 is a perspective view of an optical quad probe 101 for splitting a light beam into four equal light beams. The components of the quad probe 101 are contained within a suitable housing 103 or fixture 103 (see also FIG. 2). For the sake of simplicity of illustration, housing/fixture 103 is shown schematically by a dotted line rectangle, with it being understood that housing 103 is constructed to precisely and securely hold the components of quad probe 101 in the desired positional relationships to each other. A more detailed description of an exemplary quad probe including such features is provided subsequently herein with reference to FIGS. 10-12.

Referring to FIG. 3, quad probe 101 is comprised of a pair of polarizing beam splitters 102 and 104, a pair of birefringent phase plates 106 and 108 made of quartz, calcite, or another suitable birefringent material, and a pair of half-wave plates 110 and 112. The quad probe 101 may further include a collimating lens 114 that focuses the four beams 128A-128D to create a square pattern or other geometric pattern when they emerge from the probe 101. In the operation of the quad probe 101, a light beam 120 is provided via a fiber optic (not shown) or other suitable means, and initially passes through the first half wave plate 110. The first half wave plate is used to rotate the incoming beam polarization to 45 degrees with respect to the axes of the first polarizing beam splitter or prism 102, and renders the emerging beam 121 to be splittable by the first polarizing prism 102.

The first polarizing prism 102, having its internal surface 105 oriented as shown in FIG. 3, vertically splits the incident beam 121 into two intermediate beams 123A and 123B of differing polarization, but equal intensity. The two intermediate beams 123A and 123B may pass through a phase delay plate 106 having a thickness L1. The phase delay plate 106 may be made of a birefringent crystal aligned such that the first intermediate beam 123A traverses an optical path length of X micrometers, while the second intermediate beam 123B traverses an optical path length of X-$\Delta$X micrometers. The first intermediate beam 124A emerging from the phase delay plate 106 is thus delayed relative to the second intermediate beam 124B emerging from the phase delay plate 106 by an optical path length difference of $\Delta$X micrometers. The two intermediate beams 124A and 124B then pass through a second half-wave plate 112 that rotates the polarizations by 45°, and conditions the intermediate beams 125A and 125B emerging therefrom to be splittable by the second polarizing beam splitter or prism 104.

The second polarizing prism 104 splits each of the intermediate beams 125A and 125B horizontally into two beams, resulting in four beams 126A-126D. These four beams 126A-126D may then pass through a second phase delay plate 108 having a thickness of L2 that is one half of the thickness of the first phase delay plate 106. The second phase delay plate 108 may also be made of a birefringent crystal aligned such that the first beam 126A and third beam 126C traverse an optical path length of X/2 micrometers, while the second beam 126B and fourth beam 126D traverse an optical path length of X/2-$\Delta$X/2 micrometers. The first beam 127A and third beam 127C emerging from the phase delay plate 108 are thus delayed relative to the second beam 127B and fourth beam 127D emerging from the phase delay plate 108 by an optical path length difference of $\Delta$X/2 micrometers. The overall result is that the four beams 127A, 127B, 127C, and 127D are separated in phase by intervals of $\Delta$X/4 micrometers.

Figure 6:
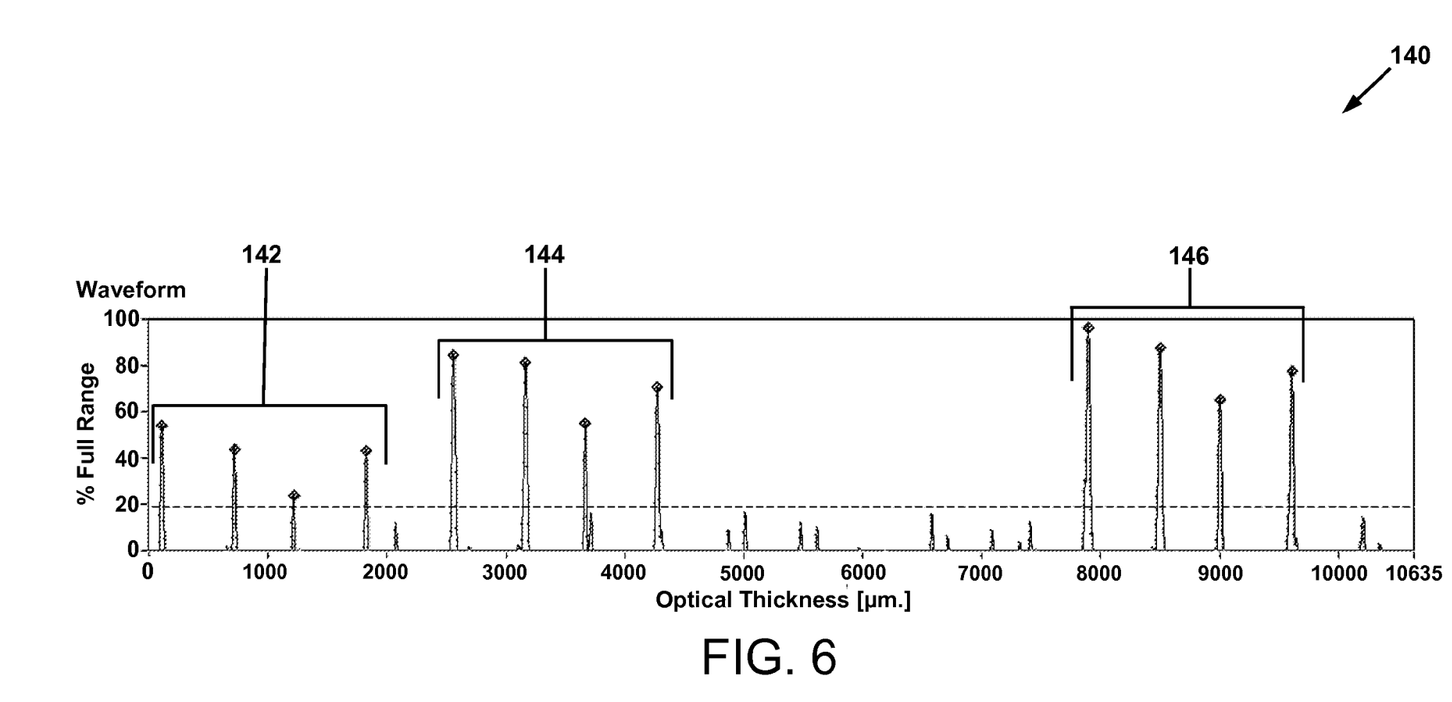
FIG. 6 is an interferogram produced by a profilometer that includes a quad probe of the present disclosure.

The quad probe 101 may be provided without the first and second phase delay plates 106 and 108, in which case the four beams 127A-127D will emerge from the probe 101 having the same phase. However, the phase differences resulting from the use of the phase delay plates 106 and 108 is beneficial in enabling each of the individual beams to be used for a separate positional and/or thickness measurement in an interferometer such as interferometer 20 (FIG. 1). FIG. 6 is an interferometer waveform 140 produced by a profilometer system 10 which includes the quad probe 101 comprising first and second phase delay plates 106 and 108. The interferometer waveform 140 depicts how the respective peaks for each of the beams are separated in phase at a reference surface and at outer and inner optical element surfaces. Further details in regard to FIG. 6 will be described subsequently herein.

Figure 4:
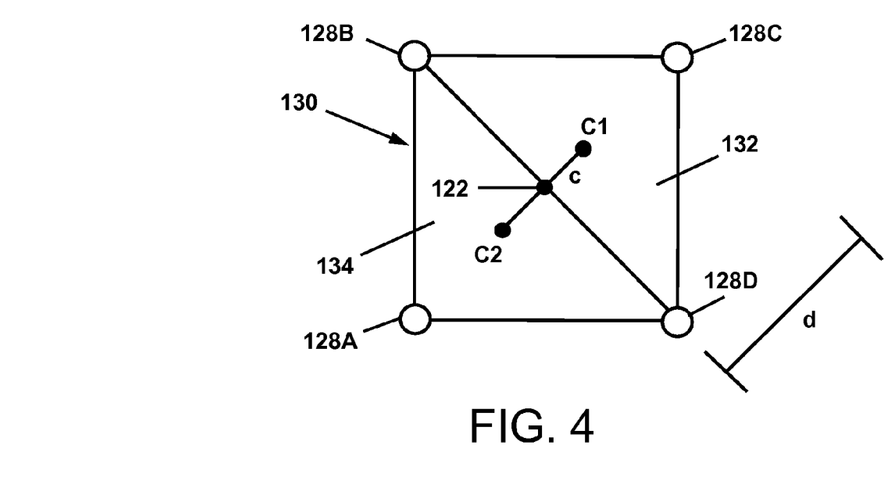
FIG. 4 is a schematic diagram of a pattern of the four beams produced by the splitting of a single beam by the quad probe, taken along the line 4-4 of FIG. 3.

The four beams 127A-127D may then pass through a collimating lens 114 that focuses the four beams 128A-128D emerging from the probe 101 in a substantially square pattern. FIG. 4 is a schematic diagram of a pattern of the four beams 128A-128D produced by the splitting of the single beam 120 by the quad probe 101. The quad probe 101 splits the incoming beam 120 into the four beams 128A-128D that are separated equally in both space and phase. The four beams 128A-128D are displaced from the optical axis 122 of the quad probe 101 by a short distance d, and are used to define a single surface facet, or multiple surface facets bounded by four point measurements made from each beam by the interferometer 20, as will now be explained.

Figure 5A:
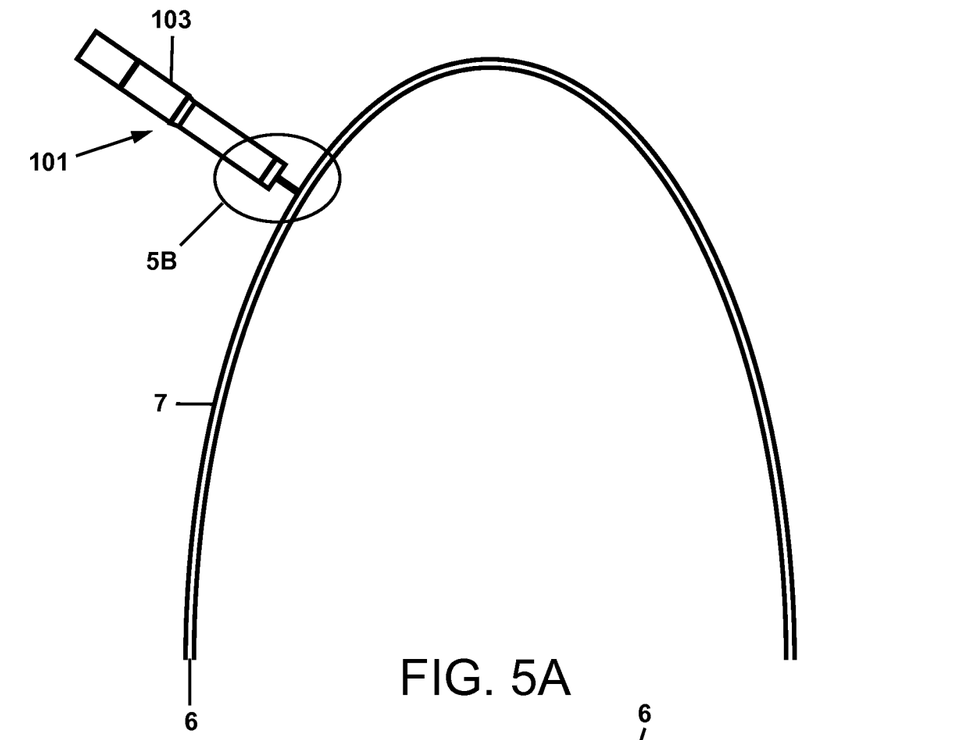
FIG. 5A is a schematic illustration of the quad probe in use, scanning an optical element.
Figure 5B:
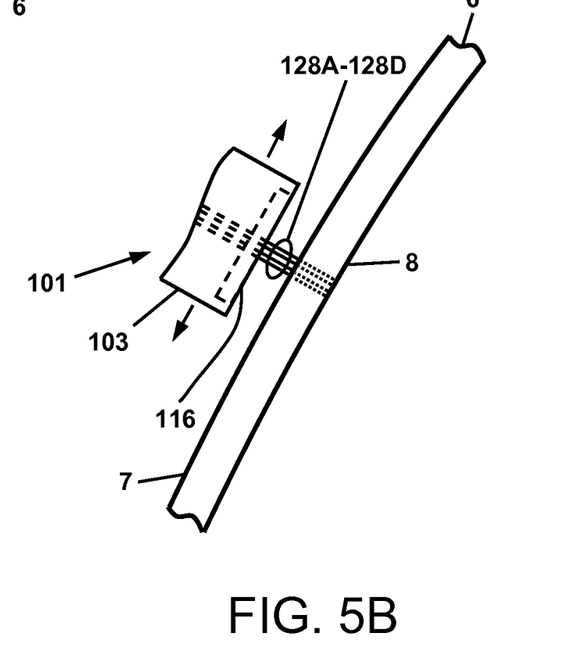
FIG. 5B is a detailed schematic illustration of a quad probe in use, taken within the region 5B of FIG. 5A.

Referring to FIGS. 4, 5A, and 5B, the actual points on the surface 7 of the optical element 6 that define a facet are the locations at which the respective beams 128A-128D intersect the surface 7. A grouping of three of the points in a measurement may be defined as a surface facet. For example, beams 128B, 128C, and 128D may define a triangular facet 132 and beams 128B, 128A, and 128D may define a triangular facet 134. Facet 132 has a centroid C1 that is located at the average coordinate of the respective three vertices defined by beams 128B, 128C, and 128D. Centroid C1, as well as a normal vector defined by the plane that passes through the three vertices of the facet 132, define the facet. In like manner, facet 134 has a centroid C2 that is located at the average coordinate of the respective three vertices defined by beams 128B, 128A, and 128D. It will be apparent that the combinations of beams 128A, 128B, and 128C, and beams 128A, 128C, and 128D may also be used to define the two triangular facets.

In another embodiment, the intersection points of the four beams 128A-128D of the quad probe 101 on the surface 7 of the element 6 may be used to define a surface facet 130 having a diamond shape, i.e. a substantially square shape. As shown in FIGS. 5A and 5B, the quad probe 101 projects the four beams 128A-128D through the reference surface 116 thereof and onto the outer surface 7 of the element 6. Each of the beams 128A-128D is reflected back from the outer surface 7, back through the reference surface 116 and the rest of the quad probe 101, and on back to the interferometer 20 (FIG. 1). Because the beams 128A-128D traverse a different length optical path, the location of the point of intersection of each beam with the surface 7 can be determined individually using the interferometer 20. If the element 6 is sufficiently transparent to the light provided by the LED 24 of the interferometer 20, a portion of the light will propagate to the inner surface 8 of the element 6 and also reflect back through the element 6 and the quad probe 101, and on back to the interferometer 20. In that manner, the thickness of the element 6 at each of the surface intersection locations of beams 128A-128D can be determined. Additionally, by scanning the quad probe 101 over the surface 7 of the element 6, the shape of the entire three-dimensional inner surface may also be determined.

FIG. 6 is an interferometer waveform 140 produced by a profilometer system 10 that includes the quad probe 101 of FIG. 3. The waveform includes three sets of four peaks. The first set 142 of four peaks are reflections of the four beams 128A-128D from the reference surface 116 at the end of the probe 101. The second set 144 of four peaks are reflections of the four beams 128A-128D from the outer surface 7 of the element 6. The third set 146 of four peaks are reflections of the four beams 128A-128D from the inner surface 8 of the element 6. The waveform is plotted with the abscissa in units of optical thickness. Because the index of refraction of the element 6 is known, the actual respective physical thicknesses of the element 6 at each of the surface intersection points of the beams 128A-128D can be calculated.

Figure 7:
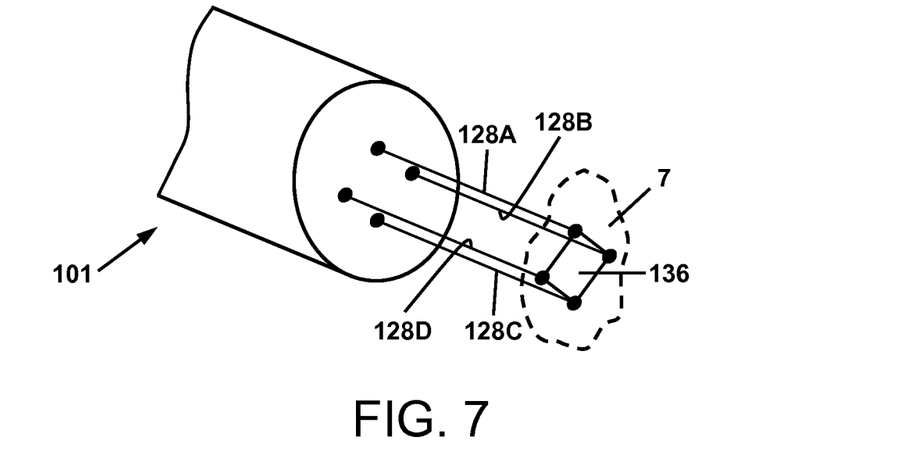
FIG. 7 is a schematic illustration of a quad probe making a measurement of a surface.

FIG. 7 is a schematic illustration of the quad probe 101 making a measurement of a surface 7. Light beams 128A-128D intersect the surface 7 and define a facet 136. Ideally, the facet 136 is a substantially square facet. However, due to variations in manufacturing tolerances of the various elements of the quad probe 101, and/or variations in tolerances in the assembly of the various elements of the quad probe 101, the beams 128A-128D may be provided by quad probe 101 in a pattern other than square.

Figure 8:
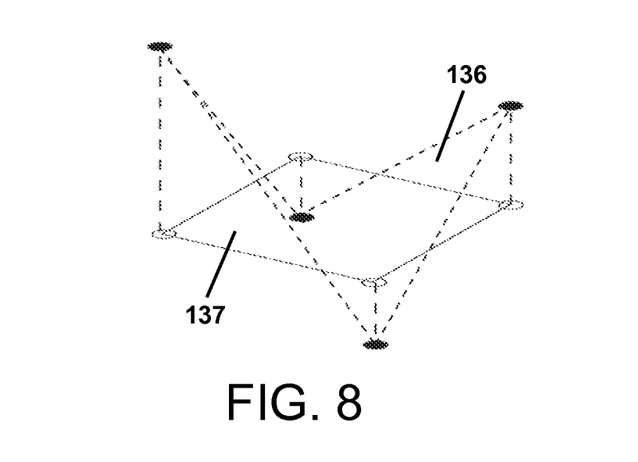
FIG. 8 is a schematic illustration of a non-planar surface facet obtained from the measurement in FIG. 7 and then converted to a best-fit surface facet.

Additionally, the surface 7 may have some measurement error introduced, such as e.g., uncertainty in the measured peak location caused by electrical or thermal effects within the interferometer. This may result in a non-planar and/or out-of-square facet 136 as depicted in FIG. 8. In such an instance, an algorithm is provided in controller 32 (FIG. 1) to calculate a best-fit surface facet 137 for the particular measurement.

Figure 9:
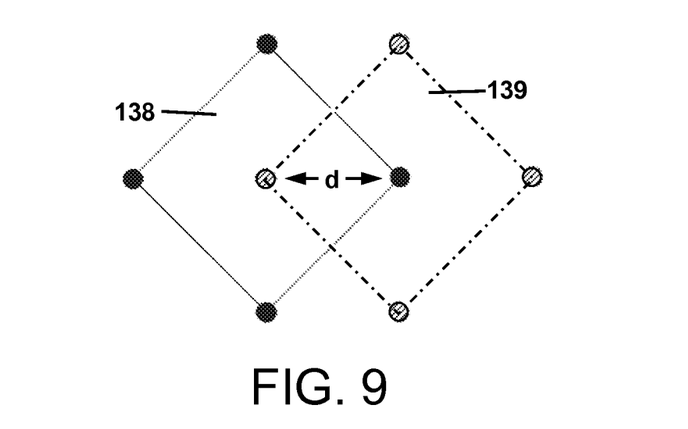
FIG. 9 is a schematic illustration of the overlapping of surface facet measurements by a quad probe to improve measurement accuracy.

To further improve the overall accuracy of the measurement of surface 7, and the accuracy in the generation of a model of the entire three-dimensional surface of the element 6, the probe 101 is scanned over surface 7 such that overlapping measurements are made as indicated in FIG. 9. In one embodiment, the extent of overlap is one half of the characteristic dimension of the facet. For example, the approximately square facets 138 and 139 of FIG. 9 are overlapped by d, which is one half of their diagonal distances. In performing the measurement of all of the surface 7, or one or more regions of the surface 7, any given surface region may be subdivided into a measurement grid comprised of M×N measurement points. Each of the M×N points is separated from its neighboring points by one-half of the characteristic dimension of a facet, thereby overlapping each facet with each of its adjacent neighboring facets. In that manner, the "best fit" for any given facet may be calculated such that it not only includes the locations of the facet vertices, but also the locations of the neighboring facets.

It is to be understood that the various optical components of the quad probe may be provided in arrangements other than that shown in FIG. 3, and still achieve the same result. By way of example, and not limitation, in one embodiment the phase delay plate 106 may precede (i.e., be placed to the left of) the polarizing beam splitter 102 of FIG. 3, thereby allowing the beam splitters 102 and 104 to be closer to each other. Alternatively or additionally, it is also possible to switch the ordering of phase delay plates 106 and 108, so that the thinner plate 108 precedes the thicker plate 106.

EXAMPLE 1

Referring again to FIGS. 3 and 4, an exemplary quad probe according to the present disclosure was prepared in which the polarizing beam splitters 102 and 104 were comprised of Wollaston prisms. The half wave plates were 10 millimeter diameter ½ wave true zero order waveplates, Stock No. NT55-555 from Edmunds Optics of Barrington, N.J. The birefringent phase delay plates 106 and 108 were comprised of calcite. The first phase delay plate 106 was provided with a first thickness and aligned such that the first emerging beam 124A traversed an optical path length of 11,542.50 micrometers, while the second emerging beam 124B traversed an optical path length of 11,482.50 micrometers, a difference of 60 micrometers. The second phase delay plate 108 was provided with a second thickness and aligned such that the respective first and third respective emerging beams 127A and 127C traversed an optical path length of 5771.25 micrometers, while the second and fourth respective emerging beams 127B and 127D traversed an optical path length of 5741.25 micrometers. In that manner, the four beams 127A, 127B, 127C, and 127D were separated in phase by intervals of 30 micrometers. The distance d between the optical axis 122 of the probe 101 and each beam 128A-128D was designed to be 140 micrometers.

EXAMPLE 2

Figures 10, 11B:
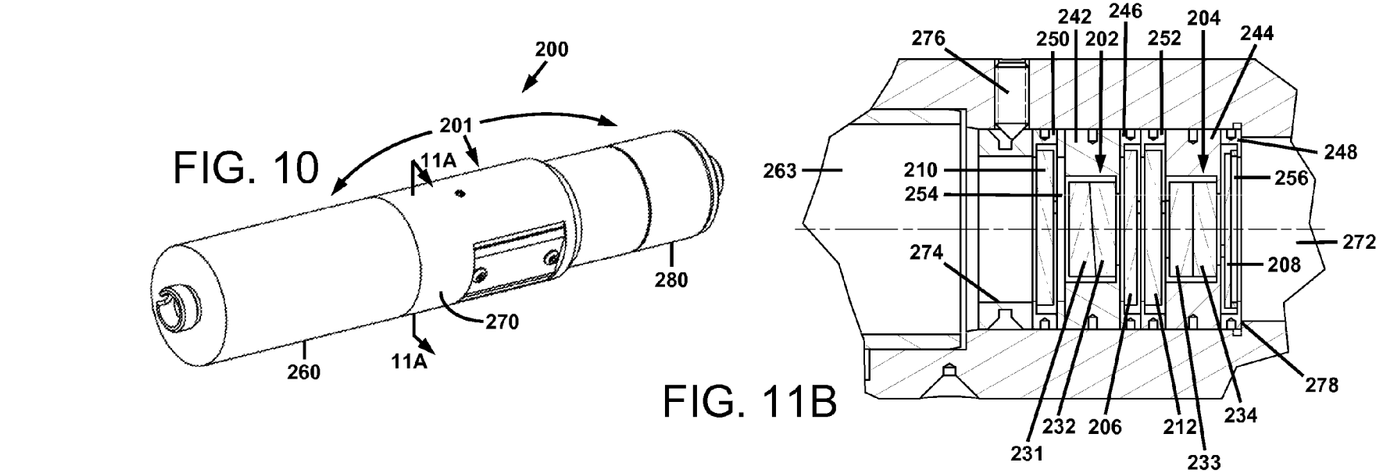
FIG. 10 is a perspective view of one exemplary quad probe of the present disclosure.
FIG. 11B is a detailed side cross-sectional view of a central region of the quad probe of FIG. 11A.
Figure 11A:
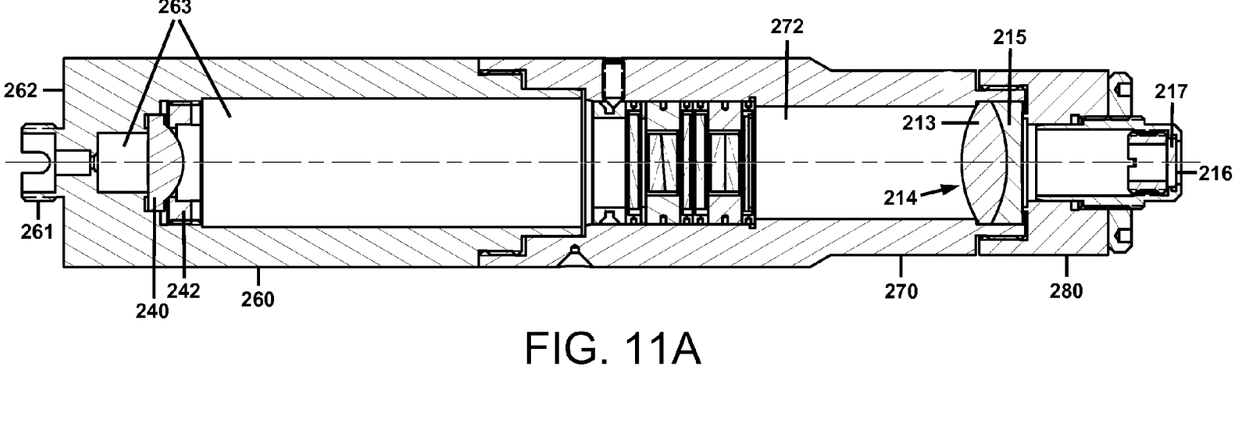
FIG. 11A is a side cross-sectional view of the exemplary quad probe of FIG. 10, taken along line 11A-11A thereof.

FIGS. 10, 11A, and 11B depict a design of another exemplary quad probe 200 of the present disclosure. The quad probe 200 is comprised of a housing or fixture 201 that contains the various optical components for splitting the incoming light beam into four beams. The housing 201 may be comprised of a rearward portion 260, a central portion 270, and a forward portion 280 removably joined to each other. The housing portions 260/270/280 may be made of any suitable material capable of being machined or otherwise formed to precision tolerances, such as aluminum, steel, stainless steel, or an engineering plastic.

The rearward housing portion 260 may include a fitting 261 on the rearward end 262 thereof configured to receive a corresponding connector fitting (not shown) of a fiber optic cable assembly (not shown). The rearward housing portion 260 is provided with a central cavity 263, within which is disposed a lens 240 fixed in position by a retaining ring 242. The lens 240 serves to capture and collimate the incoming light beam provide by an optical fiber or other transmission means (not shown) on the downstream optical components of the quad probe 200, and to focus returning light to re-enter the transmission means. The lens 240 may be an aspheric lens.

The central housing portion 270 of the quad probe 200 may be configured to contain the optical components for splitting the incoming beam into four beams as described previously with reference to FIGS. 3 and 4. The quad probe 200 may be comprised of first and second polarizing beam splitters 202 and 204, first and second birefringent phase plates 206 and 208, and first and second half-wave plates 210 and 212. The first polarizing beam splitter 202 may be comprised of first and second Wollaston prisms 231 and 232, and the second polarizing beam splitter 204 may be comprised of third and fourth Wollaston prisms 233 and 234.

The quad probe 200 may further include a collimating lens 214 that focuses the four beams (not shown) to create a square pattern when they emerge from the probe 200. The collimating lens 214 may be a doublet lens comprised of a convex lens 213 and a concave lens 215, which are retained in position within the central housing portion 270 by joining it to the forward housing portion 280. An exit window 217 comprising a reference surface 216 is contained within the forward housing portion 280. The optical components may be provided in an arrangement other than that shown in FIGS. 11A and 11B, as described previously with respect to FIG. 3.

The optical components may be held within the bore 272 of the central housing portion 270 by individual fixtures. The first and second polarizing beam splitters 202 and 204 may be held by fixtures 242 and 244; the first and second birefringent phase plates 206 and 208 may be held by fixtures 246 and 248, and the first and second half-wave plates 210 and 212 may be held by fixtures 250 and 252. The optical components may be spaced as needed by shims disposed between them, e.g. shims 254 and 256. Each of the fixtures 242-252 may be held in place with a setscrew (not shown) in the housing portion 270. Alternatively or additionally, the entire stack of optical components may be retained in the bore 272 of the housing portion 270 by a retaining ring 274. The retaining ring may be engaged with one or more beveled set screws 276, which apply an axial force to advance the stack against a shoulder 278 in the housing bore 272. The fixtures 242 and 244 of the first and second polarizing beam splitters 202 and 204 may be provided with angled set screws (not shown), or other adjustment means to set the angular positions of the beam splitters 202 and 204 within the housing bore 272. In that manner, the respective angular positions of the beam splitters 202 and 204 can be adjusted precisely so that their polarizations are exactly orthogonal to each other. In one embodiment, the quad probe 200 of FIGS. 10-11B has an overall length from the rearward fitting 261 to the forward window 216 of about 120 mm, a housing 260 diameter of about 22 mm, and a stack length of optical components 202-212 of about 12 mm.

It is therefore apparent that there has been provided, in accordance with the present disclosure, an optical probe and a method for splitting a beam of light into multiple beams, and an apparatus which includes the optical probe, the apparatus being provided for measuring and testing of objects. While the inventions herein have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. An optical probe for splitting a light beam into four light beams, the optical probe comprising a first polarizing beam splitter having a first polarization axis, a second polarizing beam splitter having a second polarization axis orthogonal to the first polarization axis, a first half wave plate, and a second half wave plate.

2. The optical probe of claim 1, wherein the first half wave plate is before first polarizing beam splitter, and the second half wave plate is after the first polarizing beam splitter, relative to the propagation of the light beam.

3. The optical probe of claim 1, further comprising a first birefringent phase plate and a second birefringent phase plate.

4. The optical probe of claim 1, further comprising a lens for collimating the four light beams.

5. The optical probe of claim 1, further comprising a window for transmitting the four light beams, the window comprising a reference surface.

6. The optical probe of claim 1, wherein the first and second polarizing beam splitters are Wollaston prisms.

7. The optical probe of claim 1, wherein the second birefringent phase plate is one half the thickness of the first birefringent phase plate.

8. The optical probe of claim 1, further comprising a housing containing the polarizing beam splitters, half wave plates, and phase plates.

9. A method of splitting an incoming light beam into four light beams comprising:
   aligning the polarization of the incoming light beam with respect to the polarization axis of a first polarizing beam splitter;
   splitting the incoming light beam into a first intermediate light beam of a first polarization, and a second intermediate light beam of a second polarization;
   delaying the first intermediate light beam relative to the second intermediate light beam;
   aligning the polarizations of the first and second intermediate light beams with respect to the polarization axis of a second polarizing beam splitter; and
   further splitting the first and second intermediate light beams into a first light beam of a third polarization, a second light beam of a fourth polarization, a third light beam of a fifth polarization, and a fourth light beam of a sixth polarization.

10. The method of claim 9, further comprising delaying the first light beam relative to the second light beam and delaying the third light beam relative to the fourth light beam.

11. The method of claim 9, further comprising collimating the first, second, third, and fourth light beams.

12. The method of claim 9, further comprising passing the first, second, third, and fourth light beams through a window comprising a reference surface.

13. An optical profilometer comprising:
- an optical probe for splitting a beam of light propagated within the profilometer into four light beams, the optical probe comprising a first polarizing beam splitter having a first polarization axis, a second polarizing beam splitter having a second polarization axis orthogonal to the first polarization axis, a first half wave plate and a second half wave plate; and
- a scanner for traversing the optical probe over a surface of an element to be measured.

14. The optical profilometer of claim 13, wherein the first half wave plate is before first polarizing beam splitter, and the second half wave plate is after the first polarizing beam splitter, relative to the propagation of the light beam.

15. The optical profilometer of claim 13, wherein the optical probe is further comprised of a first birefringent phase plate and a second birefringent phase plate.

16. The optical profilometer of claim 13, further comprising an interferometer in communication with the optical probe.

* * * * *